UNITED STATES PATENT OFFICE.

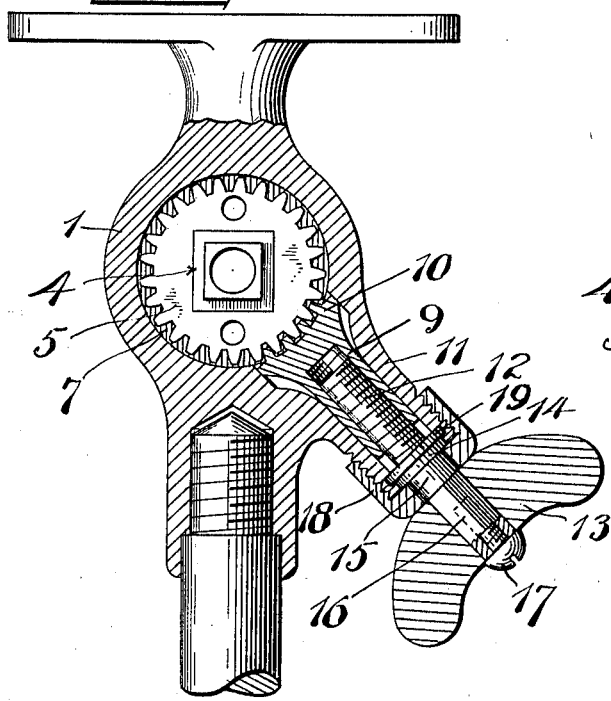
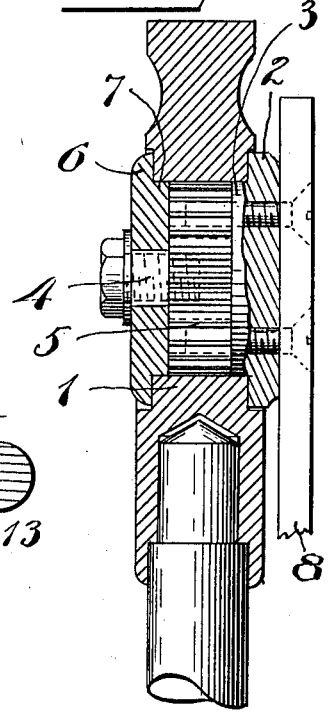
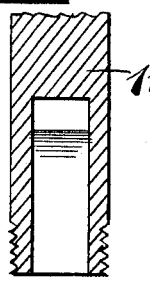
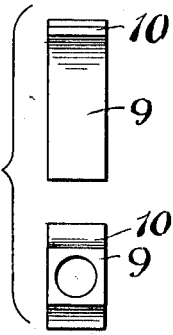
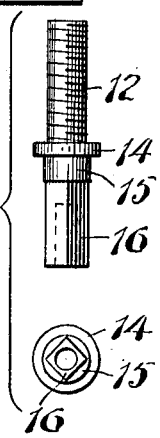
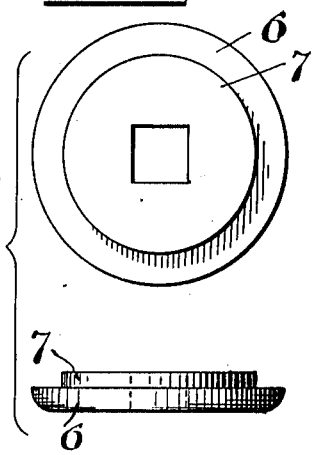

PETER N. LANDINE, OF MILFORD, CONNECTICUT, ASSIGNOR TO THE ROSTAND MANUFACTURING COMPANY, OF MILFORD, CONNECTICUT, A CORPORATION OF CONNECTICUT.

HINGE-JOINT FOR WIND-SHIELDS.

1,026,813.     Specification of Letters Patent.     Patented May 21, 1912.

Application filed December 5, 1911. Serial No. 664,109.

*To all whom it may concern:*

Be it known that I, PETER N. LANDINE, a citizen of the United States, residing at Milford, New Haven county, Connecticut, have invented certain new and useful Improvements in Hinge-Joints for Wind-Shields, of which the following is a full, clear, and exact description.

My invention relates to an improved hinge joint for automobile wind shields.

Generally speaking, the object of the invention is to provide an improved type of joint whereby the section of the wind shield carried thereby may be swung to any desired angle and there rigidly locked, the locking mechanism being such that it cannot be jarred loose by the vibration of the vehicle.

In the accompanying drawings, Figure 1 is a sectional view of the main parts of the joint, certain parts being shown in elevation. Fig. 2 is a vertical section through the center of Fig. 1. Fig. 3 is a section of part of a detail. Fig. 4 is a side and end elevation of another detail. Fig. 5 illustrates a side and end elevation of another detail. Fig. 6 is an end and edge elevation of another detail.

1 represents what I will term the ring element of the joint, the same being appropriately connected to the uprights or supporting frame for the wind shield, the particular design of said uprights and supporting connection being immaterial. Ordinarily the swinging section of a wind shield is provided with two hinge joints, one at each end; therefore, a description of one will be sufficient, since the other will be merely a duplicate thereof.

Within the ring element is a hub which may be built up in various ways, but which, in its preferred form, is constructed as follows: One end of the hub comprises a flange 2 which has a short cylindrical hub 3 projecting from one end thereof, the same being arranged to extend into the opening in the ring 1 so as to constitute a proper bearing. 4 is a squared hub of reduced proportions at the inner end of the short hub 3. 5 is a gear having a squared central passage arranged to snugly fit upon the squared hub 4. The diameter of the gear is preferably slightly less than the diameter of the short hub 3 so that the tops of the teeth will not wear the ring 1. 6 is a removable flange or cap which has at its inner end a short cylindrical hub 7, and which has a squared central opening arranged to snugly fit upon the squared hub 4, that part of the hub 4 upon which said flange seats being slightly smaller than that part of the hub upon which the gear seats. The short hub 7 extends into the ring 1 sufficiently to furnish a proper bearing. The flanges referred to, together with the hub, or that part which is within the ring, are so fitted to the ring as to prevent lateral displacement of one relatively to the other, at the same time permitting one to turn freely on or within the other.

It will be seen that in effect the hub member is so constructed as to have a smooth bearing within the ring member, whereas, the middle part of the hub member is roughened or toothed for engagement with a locking device to be later explained. A suitable screw holds the removable flange on the squared hub 4, as shown.

8 is an arm which is preferably secured to the hub member as shown, said arm being provided to furnish means for securing the joint to the swinging section of a wind shield.

9 is a locking block preferably having a somewhat enlarged head 10, the end face of which is toothed or otherwise suitably constructed to engage with the rough or toothed part 5 of the hub to lock the entire hub against rotation in the ring 1 when the wind shield arm 8 has been adjusted to the desired angle.

11 is a hollow lateral extension or housing at one side of the ring 1 in which the block 9 slides but cannot turn. The rear end of the block is provided with an internal threaded bore into which projects a screw 12 controlled by a wing nut 13 so that by turning the latter, the locking device may be positively moved into or out of engagement with the hub. The screw 12 is held in the lateral extension or housing for the block in such a manner that it can turn but is incapable of substantial longitudinal movement, the parts being so assembled that they cannot rattle loose. In the preferred form, the screw 12 has a flange 14 intermediate its length. Outside of the flange is a short cylindrical hub 15 and outside of the hub 15 is a squared portion 16. The wing nut 13 has a squared passage to fit upon the squared portion 16, while 17 is a screw to hold the wing nut on said squared portion.

18 is a threaded cap in the end of which is a central perforation which furnishes a bearing for the short round hub 15 of the screw.

19 is a steel washer preferably located between the inner end wall of the cap 18 and the rear end of the locking block 9 to protect the inner wall of the cap from injury by the rear end of the block 9 in the event the latter is drawn back to an unnecessary degree.

When the parts are assembled as shown, a rotation of the screw 12 in one direction or the other imparts reciprocal movement to the locking block. The thread of the screw 12 is preferably left handed whereby a right hand rotation, or the natural direction of rotation of the wing nut, will force the locking block into locking engagement with the hub, and left hand rotation will positively retract said locking block to guarantee freeing the hub to permit the shield to be adjusted.

What I claim is:

1. A hinge joint for a wind shield comprising a ring member, a hub housed within and bearing at each end upon the inner circumference of said ring member, the middle portion of the circumference of said hub being roughened, the highest part of said roughened portion being spaced away from the surrounding wall of said ring member, a manually controllable locking device carried by said ring member and coacting with the roughened part of the hub, and flanges at the ends of said hub overstanding the ends of the ring member.

2. A hinge joint for a wind shield comprising a ring member, a hub housed within and bearing at each end upon the inner circumference of said ring member, the middle portion of the circumference of said hub being roughened, the highest part of said roughened portion being spaced away from the surrounding wall of said ring member, a manually controllable locking device carried by said ring member and coacting with the roughened part of the hub, and flanges secured to the ends of said hub and overstanding the ends of the ring member.

3. A hinge joint for a wind shield comprising a ring member, a hub housed within and bearing at each end upon the inner circumference of said ring member, the middle portion of the circumference of said hub being roughened, the highest part of said roughened portion being spaced away from the surrounding wall of said ring member, a manually controllable locking device carried by said ring member and coacting with the roughened part of the hub, flanges at the ends of said hub overstanding the ends of the ring member, and a coacting arm for the swinging section of a wind shield, said arm being carried by the fixed flange of the hub.

4. A hinge joint for a wind shield comprising a ring member, a hub housed within and bearing at each end upon the inner circumference of said ring member, the middle portion of the circumference of said hub being roughened, the highest part of said roughened portion being spaced away from the surrounding wall of said ring member, a manually controllable locking device carried by said ring member and coacting with the roughened part of the hub, and flanges at the ends of said hub overstanding the ends of the ring member, said locking means being located wholly at one side of said hub.

5. A hinge joint for a wind shield comprising a ring member, a hub housed within and bearing at each end upon the inner circumference of said ring member, the middle portion of the circumference of said hub being roughened, the highest part of said roughened portion being spaced away from the surrounding wall of said ring member, a manually controllable locking device carried by said ring member and coacting with the roughened part of the hub, flanges at the ends of said hub overstanding the ends of the ring member, said locking means being located wholly at one side of said hub, and means for positively moving said locking means toward and from the hub.

6. A hinge joint for a wind shield comprising a ring member, a hub housed within and bearing at each end upon the inner circumference of said ring member, the middle portion of the circumference of said hub being roughened, the highest part of said roughened portion being spaced away from the surrounding wall of said ring member, a manually controllable locking device carried by said ring member and coacting with the roughened part of the hub, flanges at the ends of said hub overstanding the ends of the ring member, said locking means being located wholly at one side of said hub, means for positively moving said locking means toward and from the hub, said locking means including a slidable but non-rotatable head block and a rotatable screw coacting with the head block, and means for holding said screw against longitudinal movement.

PETER N. LANDINE.

Witnesses:
  R. C. MITCHELL,
  E. E. MORSE.